(12) United States Patent
Brouk et al.

(10) Patent No.: US 12,497,243 B2
(45) Date of Patent: Dec. 16, 2025

(54) STRIP BELT CONVEYOR ASSEMBLY

(71) Applicant: Intelligrated Headquarters, LLC, Mason, OH (US)

(72) Inventors: Justin Brouk, Cincinnati, OH (US); Felipe de Almeida, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 146 days.

(21) Appl. No.: 18/455,777

(22) Filed: Aug. 25, 2023

(65) Prior Publication Data

US 2025/0066129 A1 Feb. 27, 2025

(51) Int. Cl.
*B65G 15/12* (2006.01)
*B65G 15/50* (2006.01)
*B65G 23/44* (2006.01)

(52) U.S. Cl.
CPC ............. *B65G 15/12* (2013.01); *B65G 23/44* (2013.01); *B65G 15/50* (2013.01)

(58) Field of Classification Search
CPC ........ B65G 15/12; B65G 15/22; B65G 39/20; B65G 15/50; B65G 23/44
USPC .................................................. 198/813–817
See application file for complete search history.

(56) References Cited

U.S. PATENT DOCUMENTS

| 808,122 | A | * | 12/1905 | Tanck | ..................... | B65G 23/44 |
| | | | | | | 198/816 |
| 5,947,264 | A | * | 9/1999 | Eltvedt | ................ | B65G 21/105 |
| | | | | | | 198/816 |
| 6,811,018 | B2 | * | 11/2004 | Cotter | ..................... | B65G 15/50 |
| | | | | | | 198/810.01 |
| 7,035,714 | B2 | | 4/2006 | Anderson et al. | | |
| 7,232,029 | B1 | * | 6/2007 | Benedict | ................ | B65G 23/44 |
| | | | | | | 198/860.1 |
| 7,467,704 | B2 | * | 12/2008 | Vertogen | ................ | B65G 39/02 |
| | | | | | | 198/460.1 |

(Continued)

FOREIGN PATENT DOCUMENTS

AT 393930 B 1/1992
CN 102874589 A 1/2013

(Continued)

OTHER PUBLICATIONS

Translation of Korean document (Year: 2021).*
Extended European Search Report Mailed on Jan. 3, 2025 for EP Application No. 24191850, 9 page(s).

*Primary Examiner* — Mark A Deuble
(74) *Attorney, Agent, or Firm* — Alston & Bird LLP

(57) ABSTRACT

In various aspects, a strip belt conveyor assembly defines a longitudinal direction and a transverse direction. The strip belt conveyor assembly can include a plurality of roller assemblies. Each of the plurality of roller assemblies can include a tensioning assembly and a roller that is rotatably coupled to the tensioning assembly. The tensioning assembly can include a first translatable member that is configured to translate in the transverse direction and a second translatable member that is configured to translate in the longitudinal direction. The tensioning assembly can be configured such that translation of the first translatable member in the transverse direction causes the translation of the second translatable member in the longitudinal direction.

19 Claims, 5 Drawing Sheets

(56) References Cited

U.S. PATENT DOCUMENTS

| | | | |
|---|---|---|---|
| 7,584,839 B2 * | 9/2009 | Bugge | B65G 21/2072 |
| | | | 198/841 |
| 7,584,840 B2 * | 9/2009 | Mishmash | B65G 47/52 |
| | | | 198/604 |
| 8,069,976 B1 | 12/2011 | Fortenbery et al. | |
| 2009/0032372 A1 | 2/2009 | Mishmash et al. | |
| 2011/0168527 A1 * | 7/2011 | Fatato | B65G 17/40 |
| | | | 198/846 |
| 2020/0079591 A1 | 3/2020 | Droste et al. | |

FOREIGN PATENT DOCUMENTS

| | | | | |
|---|---|---|---|---|
| CN | 216271490 U | 4/2022 | | |
| DE | 8707213 U1 | 7/1987 | | |
| EP | 0112464 A1 | 7/1984 | | |
| EP | 3414192 B1 | 11/2021 | | |
| KR | 102217126 B1 * | 2/2021 | | B65G 15/12 |
| RU | 2054372 C1 | 2/1996 | | |
| WO | 2011/085325 A2 | 7/2011 | | |

* cited by examiner

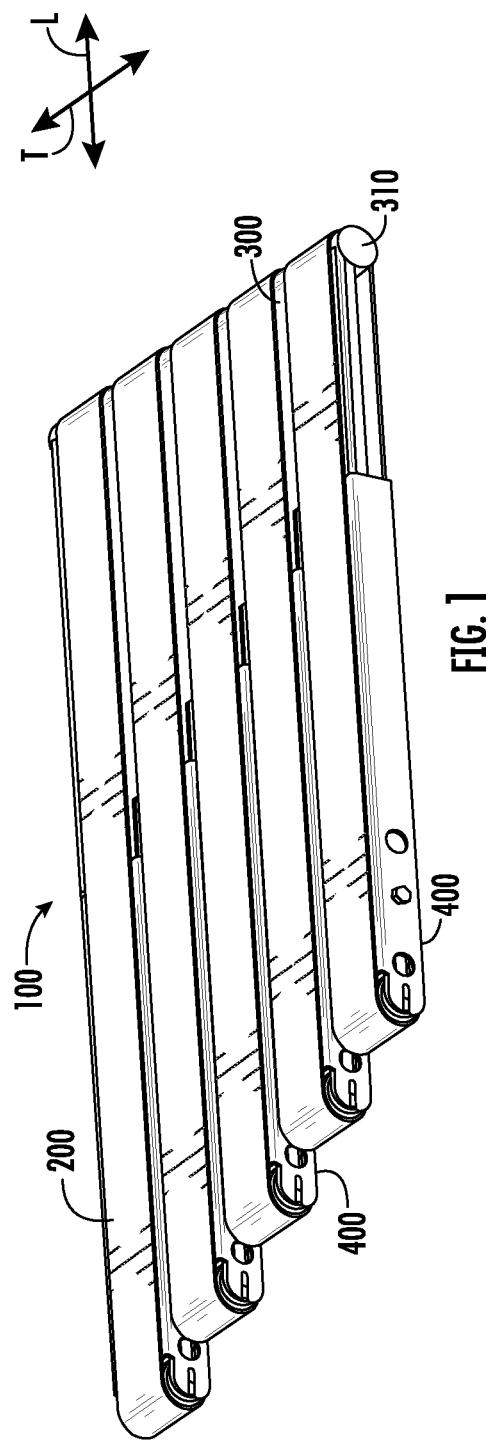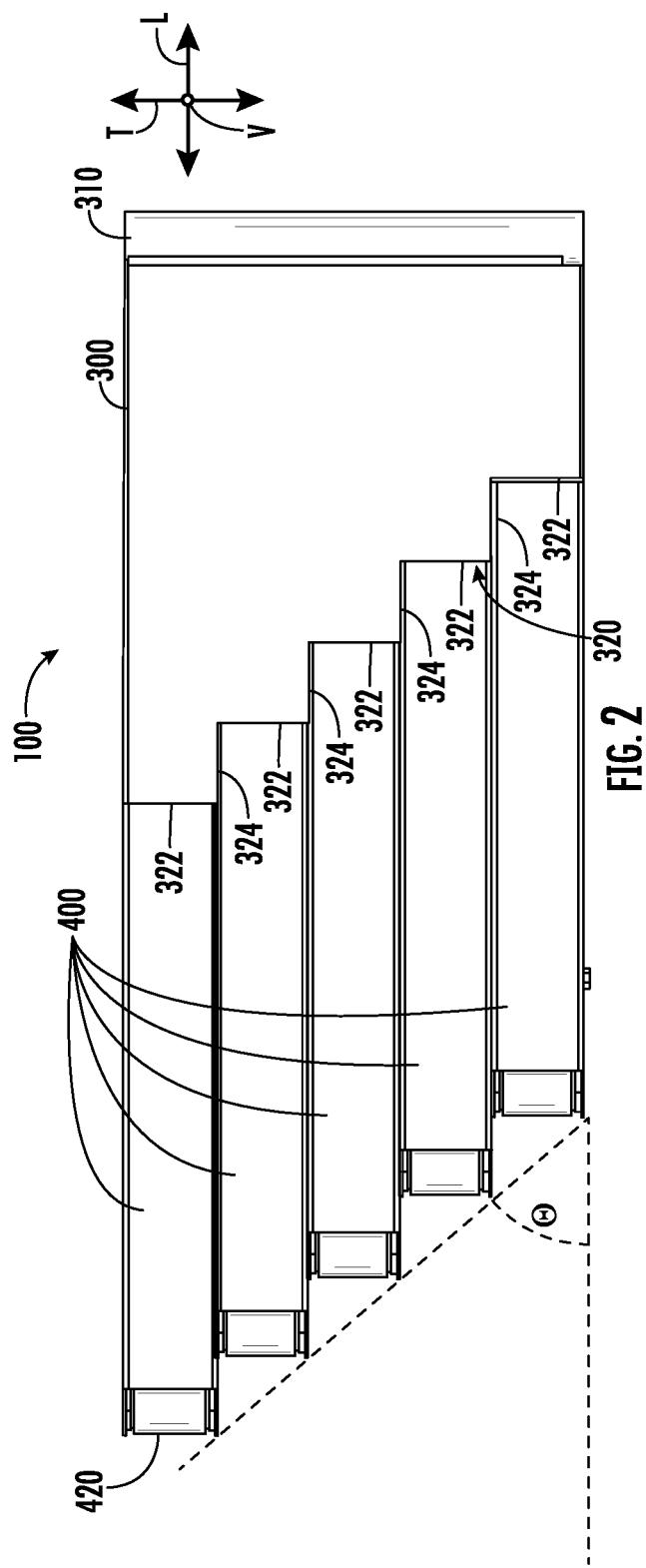

STRIP BELT CONVEYOR ASSEMBLY

TECHNICAL FIELD

The present application relates generally to a strip belt conveyor assembly. More specifically, the present application relates to a deck and a tensioning assembly for a strip belt conveyor system.

BACKGROUND

Generally, a conveyor system can convey, handle, sort, and organize various type of objects (e.g. cartons, cases, containers, shipment boxes, totes, packages, polybags, jiffy packaging, and/or the like). A strip belt conveyor, such as a strip belt merge conveyor, can be used to combine multiple streams of conveyed objects into a single stream. Typically, the strip belt conveyor is positioned between two or more other conveyor assemblies that are oriented at an angle relative to each other.

Strip belt conveyor assemblies may include multiple belts that are formed as loops. Conventional strip belt conveyor assemblies typically include a singular tensioning mechanism to adjust the tension of all of the belts of the strip belt conveyor assembly. In order for all of the belts to have the desired tension, it is necessary for the manufacturing or engineering tolerances of the belt to be tight, which may increase the cost or manufacturing lead times of the belts of the conventional strip belt conveyor assemblies. Additionally, even though the manufacturing or engineering tolerances may be tight, the lengths of each belt of a conventional strip belt conveyor assembly may still vary. As such, it may be necessary to tighten all of the belts with the singular tensioning mechanism such that the longest belt is sufficiently tight. This may cause shorter belts to be overly tight, which may decrease their durability and the durability of the rollers that move the belts. Also, in the event that a belt of a conventional strip belt conveyor assembly needs to be replaced, all belts of the assembly would need to be de-tensioned by the singular tensioning mechanism before the belt could be removed and replaced. De-tensioning all of the belts to replace a singular belt may cause additional downtime.

The inventors have identified these and numerous other deficiencies and problems with the existing technologies in this field. Through applied effort, ingenuity, and innovation, many of these deficiencies and problems have been solved by developing solutions that are structured in accordance with the embodiments of the present disclosure, many examples of which are described in detail herein.

BRIEF SUMMARY

In general, embodiments of the present disclosure provided herein include apparatuses to provide for improved strip belt conveyor assemblies.

In various aspects, a strip belt conveyor assembly defines a longitudinal direction and a transverse direction. The strip belt conveyor assembly can include a deck having a stepped portion that has a plurality of transverse portions. Each of the plurality of transverse portions can be positioned at a different location along the longitudinal direction. The strip belt conveyor assembly can include a plurality of roller assemblies, each of the plurality of roller assemblies can be positioned proximate to a corresponding transverse portion of the plurality of transverse portions.

In various examples, the strip belt conveyor assembly includes a plurality of belts that each extend around a corresponding roller assembly and the deck.

In various examples, a longitudinal length of each of the plurality of roller assemblies is approximately equal.

In various examples, each of the plurality of roller assemblies includes a roller and a tensioning assembly that is configured to translate the roller in the longitudinal direction.

In various aspects, a strip belt conveyor assembly defines a longitudinal direction and a transverse direction. The strip belt conveyor assembly can include a plurality of roller assemblies. Each of the plurality of roller assemblies can include a tensioning assembly and a roller that is rotatably coupled to the tensioning assembly. The tensioning assembly can include a first translatable member that is configured to translate in the transverse direction and a second translatable member that is configured to translate in the longitudinal direction. The tensioning assembly can be configured such that translation of the first translatable member in the transverse direction causes the translation of the second translatable member in the longitudinal direction.

In various examples, the roller is rotatably coupled to the second translatable member such that the translation of the second translatable member in the longitudinal direction causes the roller to translate in the longitudinal direction.

In various examples, one of the first translatable member or the second translatable member includes a slot. The other of the first translatable member or the second translatable member can include a corresponding feature that is positioned within the slot.

In various examples, the first translatable member is configured to translate along a threaded shaft, the threaded shaft can be configured to translate the first translatable member in the transverse direction when the threaded shaft is rotated.

In various examples, the strip belt conveyor assembly includes an anti-rotation means that is configured to prevent a rotation of the threaded shaft.

In various examples, the strip belt conveyor assembly includes an insert that has one or more female threads. The threaded shaft can be positioned within the insert.

In various examples, a longitudinal length of each of the plurality of roller assemblies is approximately equal.

In various examples, the first translatable member has a first angled portion and the second translatable member has a second angled portion that corresponds to the first angled portion of the first translatable member.

In various examples, the strip belt conveyor assembly includes a deck having a stepped portion that includes a plurality of transverse portions. Each of the plurality of transverse portions can be positioned at a different location along the longitudinal direction. Each of the plurality of roller assemblies can be positioned proximate to a corresponding transverse portion of the plurality of transverse portions.

In various aspects, a roller assembly for a conveyor assembly defines a longitudinal direction and a transverse direction, the roller assembly includes a roller and a tensioning assembly. The tensioning assembly can include a first translatable member that is configured to translate in the transverse direction and a second translatable member that is configured to translate in the longitudinal direction. The roller can be rotatably coupled to the second translatable member. The roller assembly can be configured such that translation of the first translatable member in the transverse direction causes the translation of the second translatable member in the longitudinal direction.

In various examples, the roller is rotatably coupled to the second translatable member such that the translation of the second translatable member in the longitudinal direction causes the roller to translate in the longitudinal direction.

In various examples, one of the first translatable member or the second translatable member includes a slot, the other of the first translatable member or the second translatable member includes a corresponding feature that is positioned within the slot.

In various examples, the first translatable member is configured to translate along a threaded shaft. The threaded shaft can be configured to translate the first translatable member in the transverse direction when the threaded shaft is rotated.

In various examples, the roller assembly includes an insert that has one or more female threads. The threaded shaft can be positioned within the insert.

In various examples, the first translatable member includes a through hole that has one or more threads The threaded shaft can be positioned within the through hole of the first translatable member.

In various examples, the first translatable member has a first angled portion and the second translatable member has a second angled portion that corresponds to the first angled portion of the first translatable member.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 3:
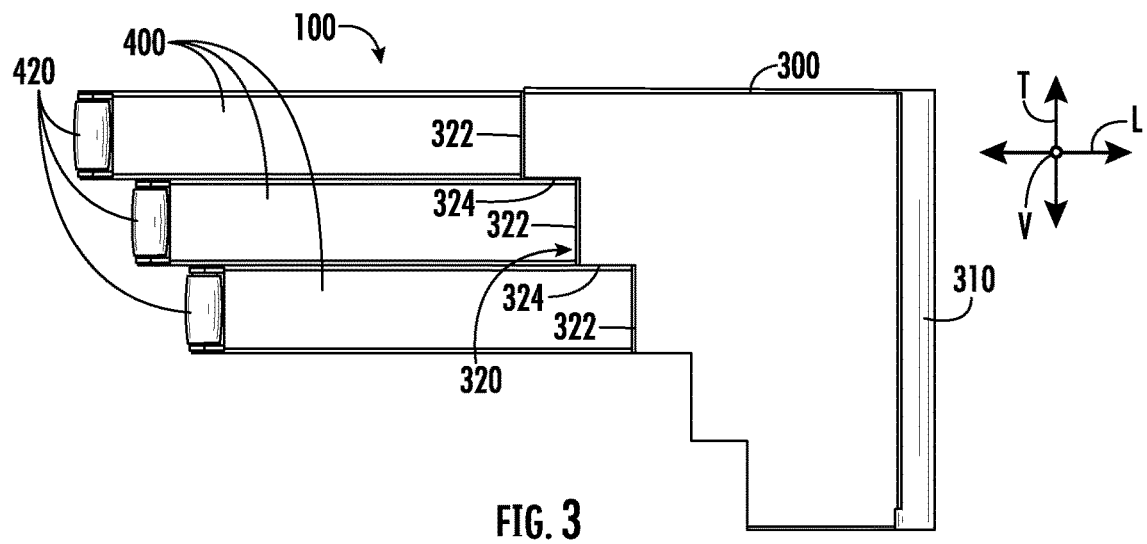

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of a strip belt conveyor assembly, in accordance with an example embodiment.

FIG. 2 provides a top view of a strip belt conveyor assembly, in accordance with an example embodiment.

FIG. 3 provides a top view of a strip belt conveyor assembly, in accordance with an example embodiment.

Figure 4:
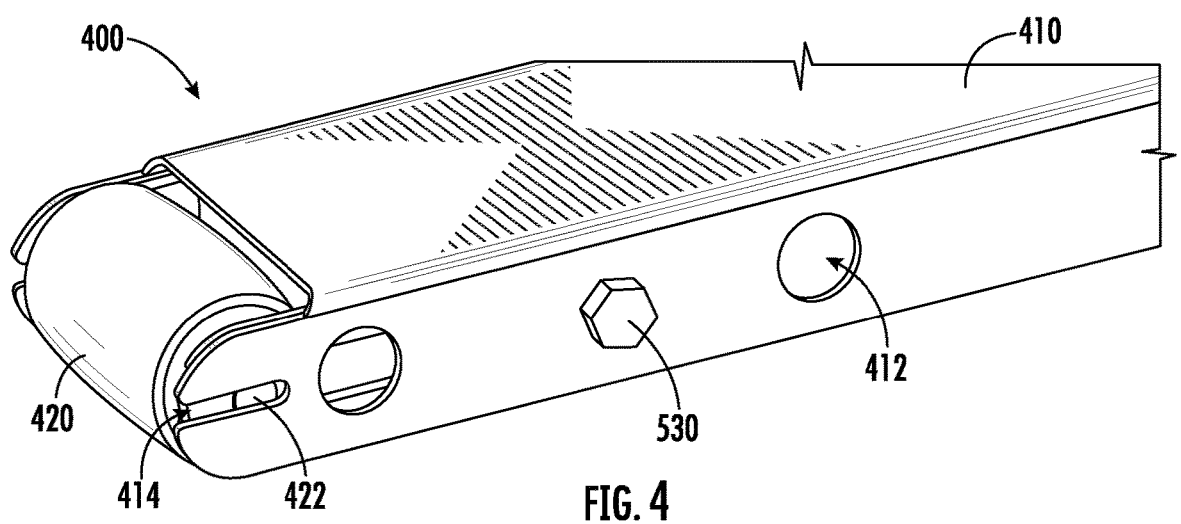

FIG. 4 provides a perspective view of a roller assembly, in accordance with an example embodiment.

FIGS. 5-8 provide perspective, bottom views of a roller assembly, in accordance with an example embodiment.

Figure 9:
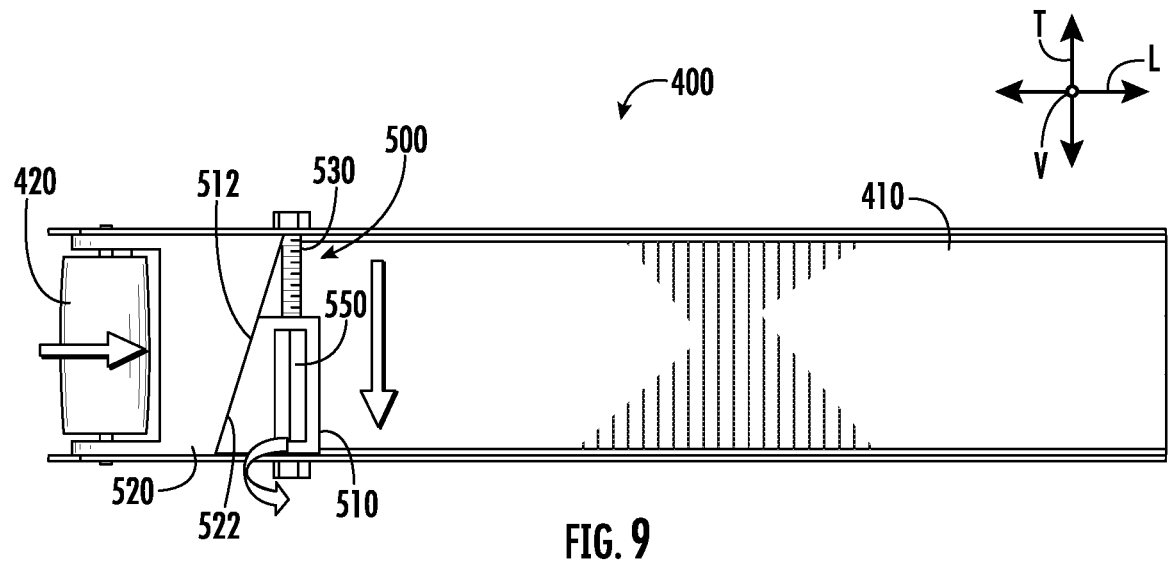
Figure 10:
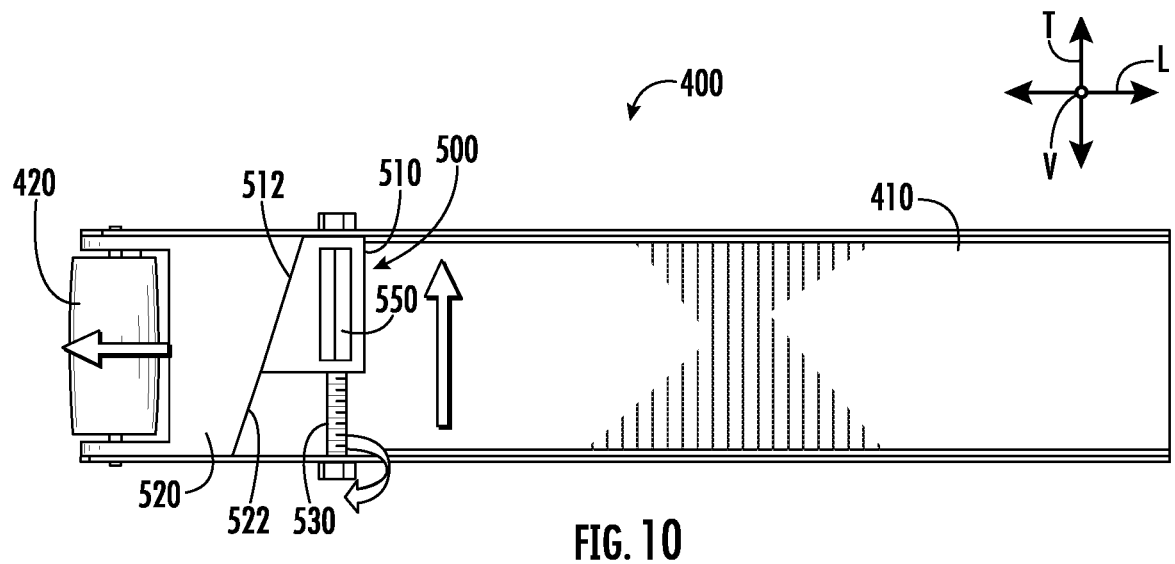

FIGS. 9 and 10 provide bottom views of a roller assembly, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, terms of approximation, such as "approximately," "substantially," or "about," refer to being within manufacturing or engineering tolerances. For example, terms of approximation may refer to being withing a five percent margin of error.

Referring now to FIG. 1, a perspective view of a strip belt conveyor assembly 100 is provided, in accordance with an example embodiment. The strip belt conveyor assembly 100 can define a longitudinal direction L, a transverse direction T that is orthogonal to the longitudinal direction L, and a vertical direction V (FIG. 2) that is orthogonal to both the longitudinal direction L and the transverse direction T. The strip belt conveyor assembly 100 can include a deck 300, a plurality of roller assemblies 400 that each extend generally in the longitudinal direction L, and a plurality of belts 200. Each of the plurality of belts 200 can form a loop and can extend around the deck 300 and a corresponding roller assembly 400. Each roller assembly 400 of the plurality of roller assemblies 400 can be configured substantially similar (e.g., within manufacturing or engineering tolerances). For examples, each roller assembly 400 can have substantially equal lengths (e.g., lengths that are within 13 millimeters (mm) of each other, such as within 5 mm of each other, such as within 2 mm of each other).

Referring now to FIG. 2, a top view of a strip belt conveyor assembly 100 is provided, in accordance with an example embodiment. In this view, the belts 200 are hidden. As depicted in FIG. 2, the deck 300 can include a deck roller 310 and a stepped portion 320. The stepped portion 320 can include a plurality of transverse portions 322 and a plurality of longitudinal portions 324 that alternate in position with the transverse portions 322. Notably, each of the transverse portions 322 of the stepped portion 320 of the deck 300 are positioned at different locations along the longitudinal direction L in a stepped or staggered configuration. Each roller assembly 400 can be positioned proximate to a different transverse portion 322 of the deck 300. Also, the roller 420 of each roller assembly 400 can be positioned proximate to an end of the roller assembly 400 that is furthest away from the deck 300.

As will be appreciated, the strip belt conveyor assembly 100 of FIG. 1 and FIG. 2 can be used to transport an object to another conveyor system that is positioned at an angle θ relative to the longitudinal direction L defined by the strip belt conveyor assembly 100 (e.g., at an angle other than 0 or 180 degrees). For example, the transverse portions 322 of the deck 300 can be positioned so that they collectively form an angle θ. Because each of the roller assemblies 400 are positioned proximate to a different transverse portion 322 of the deck 300 and each roller assembly 400 has a substantially equal length, the roller assemblies 400 are also collectively positioned at an angle θ relative to the longitudinal direction L, in various examples. Therefore, the strip belt conveyor assembly 100 of FIG. 2 is configured to transport an object to another conveyor system that is positioned at an angle θ in relation to the strip belt conveyor assembly 100.

In various examples, and as depicted in FIG. 2, the angle θ is approximately 50 degrees. However, the magnitude of the angle θ can be anywhere between 0 degrees and 90 degrees, such as at least 5 degrees and up to 85 degrees, such as at least 15 degrees and up to 75 degrees relative to the longitudinal direction L. For example, the angle θ can be approximately 30 degrees (e.g., within a 1 degree tolerance), 45 degrees, or 60 degrees, to name a few examples. As will be appreciated, the angle θ can be customized for a particular use by modifying the position of each transverse portion 322 of the deck 300. This configuration is beneficial because only the deck 300 of the strip belt conveyor assembly 100 needs to be modified to accommodate different configurations of a conveyor system that includes the strip belt conveyor assembly 100. Additionally, the roller assemblies 400 of the strip belt conveyor assembly 100 do not need to be modified to accommodate different configurations of a conveyor system that includes the strip belt conveyor assembly 100. As such, the roller assemblies 400 can be produced in mass, which reduces manufacturing lead times and costs, and the same configuration of the roller assemblies 400 can be used for various configurations of a conveyor system that includes the strip belt conveyor assembly 100.

Referring now to FIG. 3, a top view of a strip belt conveyor assembly 100 is provided, in accordance with an example embodiment. In various examples, it may be desirable to modify a width of the working portion of the strip belt conveyor assembly 100. To modify the width of the working portion of the strip belt conveyor assembly 100, roller assemblies 400 can either be removed from the strip belt conveyor assembly 100 or not installed onto the strip belt conveyor assembly 100. Also, a width of the deck 300 in the transverse direction T can be reduced to modify the width of the working portion of the strip belt conveyor assembly 100.

Referring now to FIG. 4, a perspective view of a roller assembly 400 of the strip belt conveyor assembly 100 of FIG. 1 is provided, in accordance with an example embodiment. The roller assembly 400 can include a housing 410 and a roller 420. Also, the roller assembly 400 can include a tensioning assembly 500 (FIG. 5) that is coupled to the housing 410 and the roller 420, which will be discussed further. As will also be discussed further, the housing 410 can include an access hole 412 to access the tensioning assembly 500 of an adjacent roller assembly 400.

Figure 5:
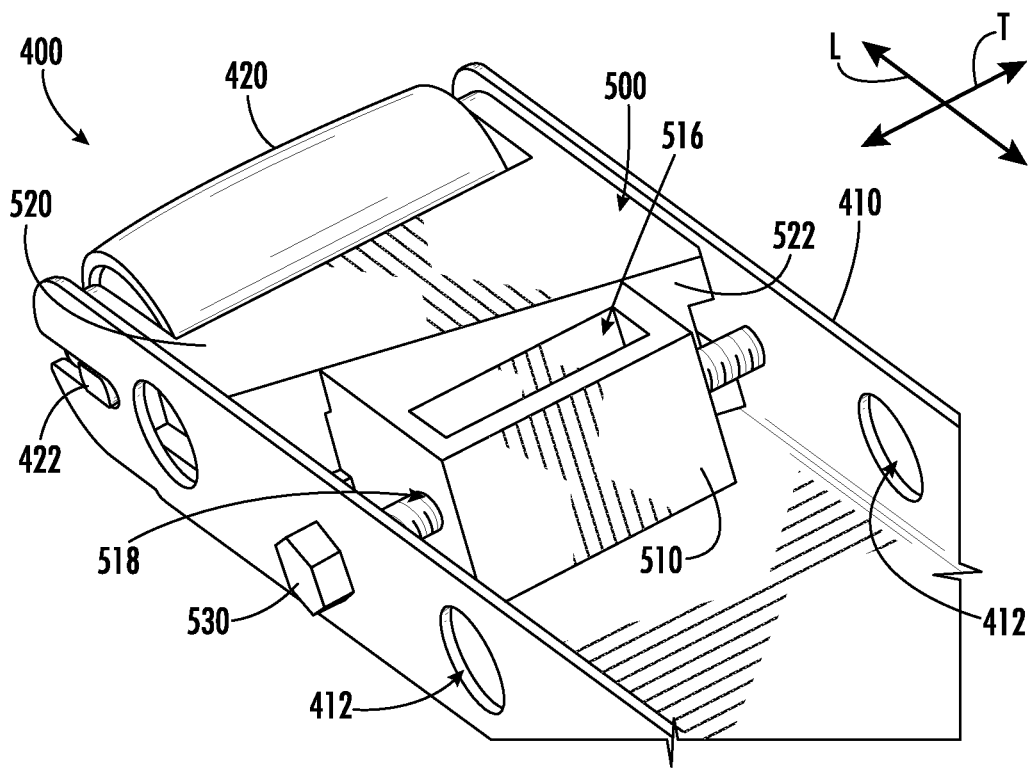
Figure 6:
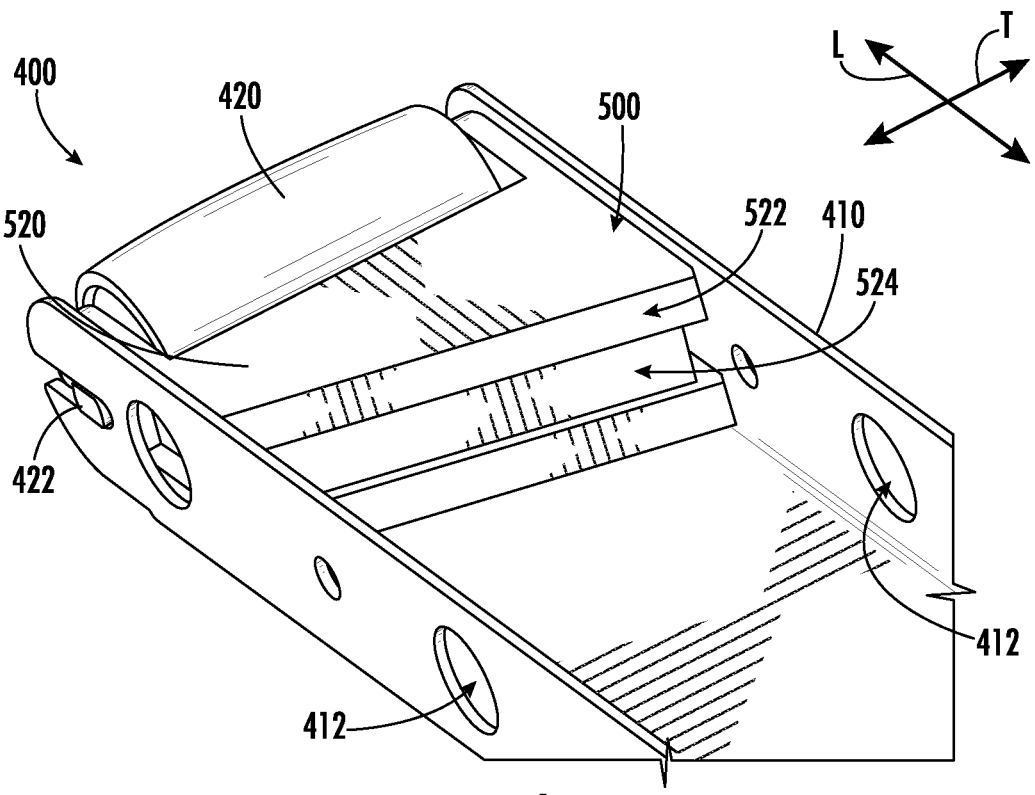
Figure 7:
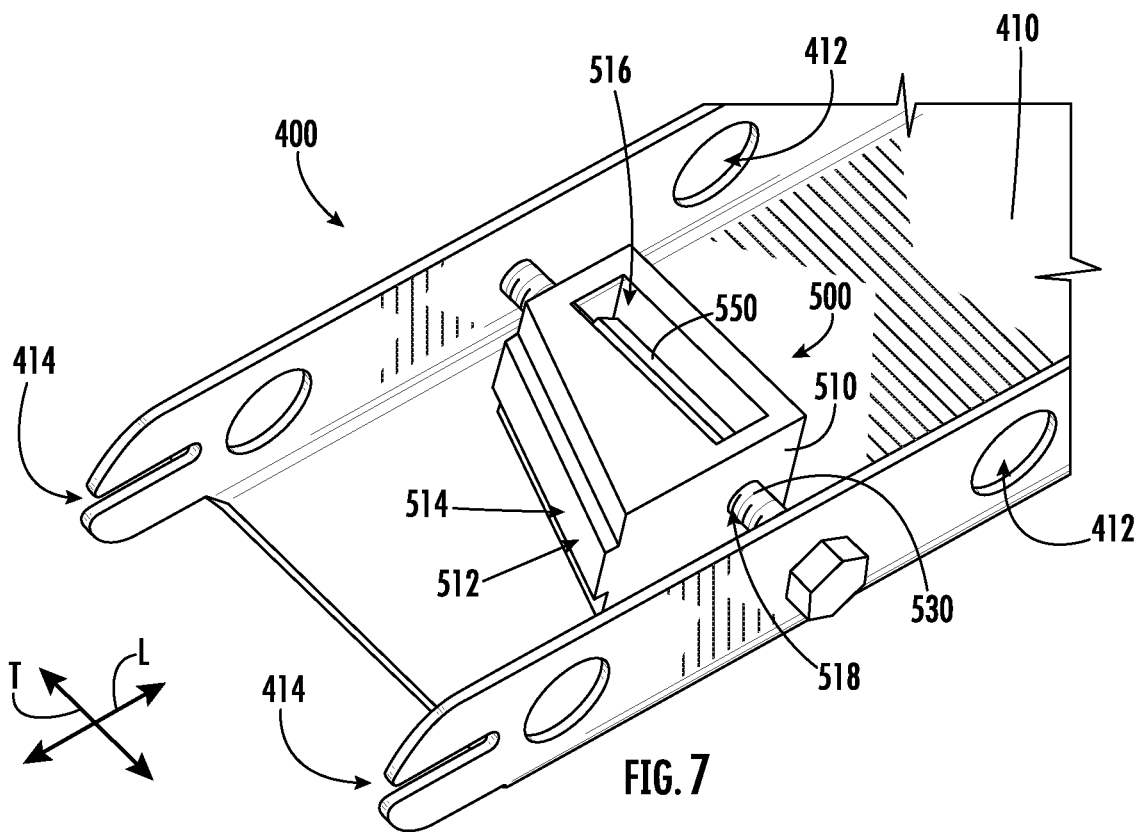
Figure 8:
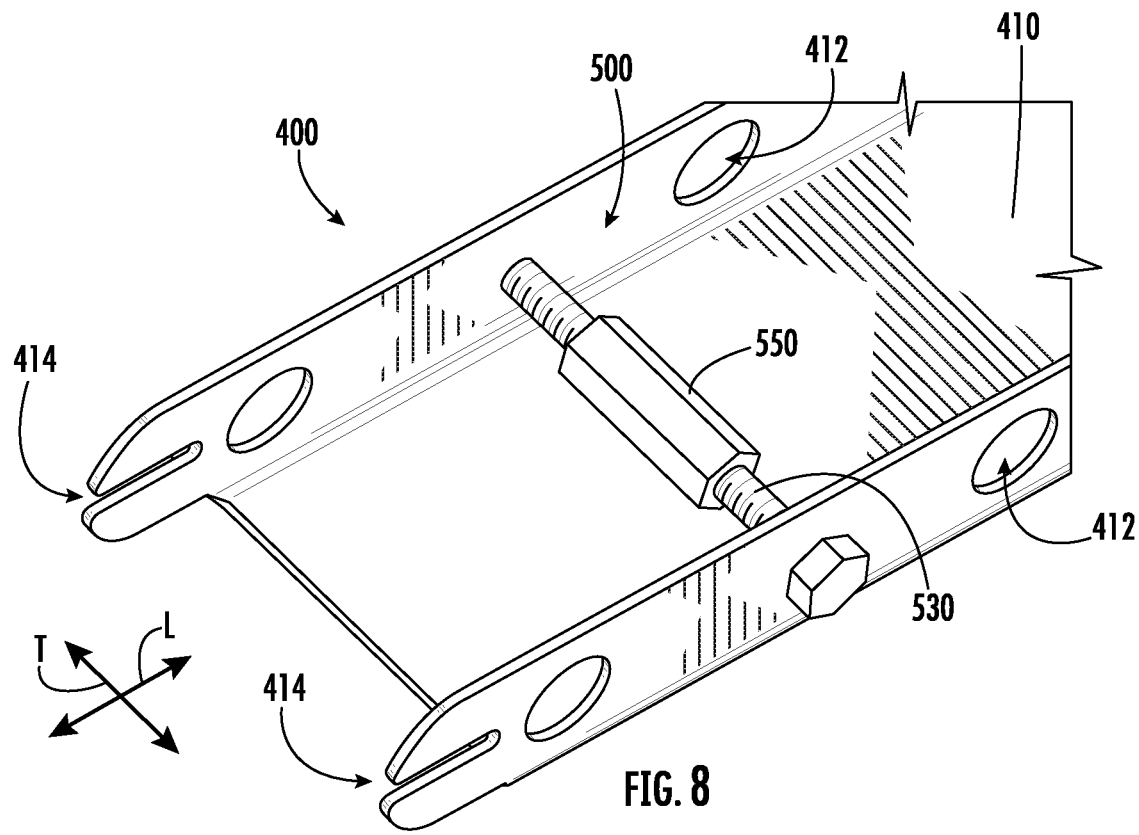

Referring now to FIGS. 5-8, perspective, bottom views of a roller assembly 400 are provided, in accordance with an example embodiment. As discussed, the roller assembly 400 can include a tensioning assembly 500. The tensioning assembly 500 can include a first translatable member 510 (FIG. 5) and a second translatable member 520 (FIGS. 5 and 6). In various examples, the tensioning assembly 500 includes a shaft 530 (FIGS. 5, 7, and 8). The tensioning assembly 500 can include an insert 550 (FIGS. 7 and 8).

In the views of FIGS. 6, 7, and 8, various components of the tensioning assembly 500 have been hidden. More specifically, in FIG. 6, the first translatable member 510, the shaft 530, and the insert 550 have been hidden to increase visibility of the second translatable member 520; in FIG. 7, the roller 420 and the second translatable member 520 have been hidden to increase the visibility of the first translatable member 510; and in FIG. 8, the roller 420, the first translatable member 510, and the second translatable member 520 have been hidden to increase the visibility of the shaft 530 and the insert 550.

In various examples, the first translatable member 510 can be configured to translate in the transverse direction T. For example, the first translatable member 510 can be configured to translate along an axis that is defined by the shaft 530. The shaft 530 can include one or more exterior threads that correspond to one or more female threads on an interior of the insert 550 (FIG. 8) that may be positioned within an orifice 516 (FIG. 7) of the first translatable member 510. The insert 550 can be positioned within the orifice 516 of the first translatable member 510 such that the insert 550 abuts the walls of the orifice 516 and remains stationary relative to the first translatable member 510. Because of the threads on the insert 550 and on the shaft 530, the rotation of the shaft 530 causes translation of the insert 550 along the shaft 530, which in turn causes translation of the first translatable member 510 along the shaft 530.

In the example of FIGS. 5 through 8, the tensioning assembly 500 includes the insert 550 that is inserted into an orifice 516 of the first translatable member 510. However, in various examples, the tensioning assembly 500 does not include the insert 550. Instead, the first translatable member 510 includes female threads on an interior surface of a through hole 518 that extends through the first translatable member 510 along the transverse direction T. As such, the rotation of the shaft 530 would directly cause translation of the first translatable member 510 in the transverse direction T.

As will be appreciated, it may be beneficial to incorporate the insert 550 into the first translatable member 510. For example, the insert can be manufactured from a metal whereas the first translatable member can be manufactured from a non-metallic material, such as plastic. In various examples, the insert 550 is a standard component, such as a hexagonal-shaped metal nut, such as a coupling nut, which can be easily procured at a relatively low cost. Also, the metallic material is typically more durable than a non-metallic material. However, when an insert 550 is incorporated into the tensioning assembly 500, the first translatable member 510 may be manufactured from a plastic, instead of a metal, which may reduce the cost of the first translatable member.

If an insert 550 is not incorporated into the tensioning assembly 500, it may be necessary to manufacture the first translatable member 510 from a metal. Additionally, internal threads would need to be incorporated into the through hole 518 of the first translatable member 510, which may increase the cost of manufacturing the first translatable member 510. As such, there are various benefits to incorporating the insert 550.

As depicted in FIG. 5, the second translatable member 520 can be positioned proximate to the first translatable member 510. The first translatable portion can include a first angled portion 512 and the second translatable member 520 can include a second angled portion 522. The first angled portion 512 of the first translatable member 510 can correspond to the second angled portion 522 of the second translatable member 520 such that they have similar angles (e.g., within a one degree tolerance) relative to a plane defined by the transverse direction T and the vertical direction V. In various examples, and as depicted, the first translatable member 510 and the second translatable member 520 remain in contact with each other.

In various examples, either the first angled portion 512 of the first translatable member 510 or the second angled portion 522 of the second translatable member 520 can include a slot 524 (FIG. 6), whereas the other of the first angled portion 512 of the first translatable member 510 or the second angle portion of the second translatable member 520 can include a corresponding feature 514 (FIG. 7). In the example of FIGS. 5-8, the second translatable member 520 includes the slot 524 and the first translatable member 510 includes the corresponding feature 514.

In various examples, and as depicted, the slot 524 and the corresponding feature 514 have a rectangular cross-sectional shape. However, in various examples, the slot 524 and the corresponding feature 514 can have other cross-sectional shapes, such as a T-shape or a dovetail shape. The slot 524 and the corresponding feature 514 can be configured to mate to prevent movement of the second translatable member 520 in the vertical direction V. In various examples, the housing 410 includes walls that extend in the vertical direction V that prevent movement of the second translatable member 520 in the transverse direction T.

The first translatable member 510 and the second translatable member 520 can be configured such that translation of the first translatable member 510 in the transverse direction T causes the translation of the second translatable member 520 in the longitudinal direction L. For example, and as depicted in FIG. 5, the first angled portion 512 of the first translatable member 510 and the second angled portion 522 of the second translatable member 520 are angled such that a movement of the first translatable member 510 in the transverse direction T causes a force to be exerted on the second translatable member 520 that is orthogonal to the first angled portion 512 of the first translatable member 510. As such, the force on the second translatable member 520 includes a transverse component and a longitudinal component. However, because movement of the second translatable member 520 is restricted by the walls of the housing 410 of the roller assembly 400, either directly or indirectly through various other components, the second translatable member 520 only translates in the longitudinal direction L.

The roller 420 of the roller assembly 400 can be rotatably coupled to the second translatable member 520 of the tensioning assembly 500. For example, the roller 420 of the roller assembly 400 can include one or more spherical bearings to allow rotation of the roller 420 relative to a roller shaft 422 that extends through the roller 420 and the second translatable member 520 of the tensioning assembly 500. The roller shaft 422 may also extend through and be slidingly coupled to the housing 410 of the roller assembly 400 to allow the movement of the roller 420 and the tensioning assembly 500 in the longitudinal direction L relative to the housing 410. For example, the housing 410 can include a slot 414 that extends generally in the longitudinal direction L that the roller shaft 422 is positioned and allowed to move within.

As previously discussed, the housing 410 can include an access hole 412. The access hole 412 can be used to access a shaft 530 of a tensioning assembly 500 of an adjacent roller assembly 400. Incorporating an access hole 412 may be beneficial because the adjustment of the tensioning assemblies 500 of the strip belt conveyor assembly 100 can be accomplished without removing any of the roller assemblies 400 from the strip belt conveyor assembly 100.

Referring now to FIG. 9 and FIG. 10, bottom views of a roller assembly 400 are provided, in accordance with an example embodiment. FIG. 9 depicts the tensioning assembly 500 of the roller assembly 400 in a minimum tension mode and FIG. 10 depicts the tensioning assembly 500 of the roller assembly 400 in a maximum tension mode. Even though only a minimum tension mode and a maximum tension mode will be described, it should be understood that the tensioning assembly 500 can be in other modes or positions that are between the minimum tension mode and the maximum tension mode.

In operation, the tensioning assembly 500 can move from the minimum tension mode to the maximum tension mode, and vice-versa, by rotating the shaft 530. For example, rotating the shaft 530 in a first circumferential direction can cause the first translatable member 510 to move upward (relative to the page) in the transverse direction T. As discussed, moving the first translatable member 510 upward (relative to the page) in the transverse direction T causes the second translatable member 520 to translate outward relative to the deck 300 (FIG. 2) in the longitudinal direction L. Because the roller 420 is coupled, either directly or indirectly, to the second translatable member 520, the roller 420 may also translate outward and away from the deck 300 in the longitudinal direction L. Because the belt 200 of the roller assembly 400 is looped around the roller assembly 400 and the deck 300, translating the roller 420 outward and away from the deck 300 increases the tension on the belt 200.

To decrease the tension on the belt 200, the shaft 530 may be rotated in a second circumferential direction that is opposite to the first circumferential direction. Rotating the shaft 530 in the second circumferential direction causes the first translatable member 510 to move downward (relative to the page) in the transverse direction T. As discussed, moving the first translatable member 510 downward in the transverse direction T causes the second translatable member 520 to translate inward and toward the deck 300 in the longitudinal direction L. Because the roller 420 is coupled, either directly or indirectly, to the second translatable member 520, the roller 420 may also translate inward toward the deck 300 in the longitudinal direction L.

Once the belt 200 has a desired tension, an anti-rotation means (not depicted) can be used to prevent rotation of the shaft 530, which may also maintain the position of the first translatable member 510, the second translatable member 520, and the roller 420 at the desired location. For example, anti-rotation means such as one or more internal tooth lock washer, keep lock nut, serrated flange lock nut, castellated nut, regular nut, jam nut, split lock washer, nylon lock nut, and/or top lock nut can be used to prevent rotation of the shaft 530. In addition to, or alternatively, cotter pins or safety wires can be used to prevent rotation of the shaft 530.

The strip belt conveyor assembly 100 of the present disclosure has various benefits. For example, engineering and manufacturing tolerances for the plurality of belts 200 of the strip belt conveyor assembly 100 can be made less stringent than the belts of conventional strip belt conveyor assemblies. In conventional strip belt conveyor assemblies, a singular tensioning mechanism is provided to adjust the tensioning of all the belts of the strip belt conveyor assembly in unison. However, as will be appreciated, this conventional configuration requires that the manufacturing and engineering tolerances of the belts to be very tight to prevent the tensioning of some of the belts being too loose or too tight, which is undesirable. The strip belt conveyor assembly 100 of the present disclosure solves this problem by allowing the tension of each of the belts 200 of the strip belt conveyor assembly 100 to be adjusted individually. As such, it is unnecessary for the manufacturing and engineering tolerances of the belts 200 to be as stringent, which may reduce costs and manufacturing lead times for the belts. Additionally, even though the belts of a conventional strip belt conveyor assembly may be tight, the lengths of each belt of a conventional strip belt conveyor assembly may still vary. As such, it may be necessary to tighten all of the belts with a singular tensioning mechanism such that the longest belt is sufficiently tight. This may cause shorter belts to be overly tight, which may decrease their durability and the durability of the rollers that move those belts. The strip belt conveyor assembly 100 of the present disclosure solves this problem by allowing the tension of each of the belts 200 of the strip belt conveyor assembly 100 to be adjusted individually. Adjusting the tension of each of the belts 200 to an appropriate tension may increase the durability of the belts and the rollers 310, 420 on which they rotate. Increasing the durability of the belts may decrease the frequency as to which the belts need to be replaced, which reduces material and labor costs and costs associated with down-time of the strip belt conveyor assembly 100.

Also, in the event that a belt of a conventional strip belt conveyor assembly needs to be replaced, all belts of the assembly would need to be de-tensioned by the singular tensioning mechanism before the belt could be removed and replaced. De-tensioning all of the belts to replace a singular belt may cause additional down-time. The strip belt conveyor assembly 100 of the present disclosure solves this problem by allowing individual belts 200 to be replaced without de-tensioning other belts 200 of the strip belt conveyor assembly 100. The ability to replace an individual belt 200 without adjusting the tension of the other belts 200 may decrease the downtime associated with replacing the individual belt 200.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A strip belt conveyor assembly that defines a longitudinal direction and a transverse direction, the strip belt conveyor assembly comprising:
   a deck comprising a stepped portion that comprises a plurality of transverse portions, each of the plurality of transverse portions positioned at a different location along the longitudinal direction; and
   a plurality of roller assemblies, each of the plurality of roller assemblies being positioned proximate to a corresponding transverse portion of the plurality of transverse portions, wherein each of the plurality of roller assemblies comprising:
      a first translatable member that is configured to translate in the transverse direction; and
      a second translatable member that is configured to translate in the longitudinal direction,
      wherein translation of the first translatable member in the transverse direction causes the translation of the second translatable member in the longitudinal direction.

2. The strip belt conveyor assembly of claim 1, further comprising a plurality of belts that each belt extends around a corresponding roller assembly and the deck.

3. The strip belt conveyor assembly of claim 1, wherein a longitudinal length of each of the plurality of roller assemblies is approximately equal.

4. The strip belt conveyor assembly of claim 1, wherein each of the plurality of roller assemblies comprises a roller and a tensioning assembly that is configured to translate the roller in the longitudinal direction.

5. The strip belt conveyor assembly of claim 1, wherein one of the first translatable member or the second translatable member comprises a slot, wherein the other of the first translatable member or the second translatable member comprises a corresponding feature that is positioned within the slot.

6. A strip belt conveyor assembly that defines a longitudinal direction and a transverse direction, the strip belt conveyor assembly comprising:
   a plurality of roller assemblies, each of the plurality of roller assemblies comprising:

a tensioning assembly and a roller that is rotatably coupled to the tensioning assembly, wherein the tensioning assembly comprises:

a first translatable member that is configured to translate in the transverse direction; and a second translatable member that is configured to translate in the longitudinal direction, wherein the tensioning assembly is configured such that translation of the first translatable member in the transverse direction causes the translation of the second translatable member in the longitudinal direction.

7. The strip belt conveyor assembly of claim 6, wherein the roller is rotatably coupled to the second translatable member such that the translation of the second translatable member in the longitudinal direction causes the roller to translate in the longitudinal direction.

8. The strip belt conveyor assembly of claim 6, wherein one of the first translatable member or the second translatable member comprises a slot, wherein the other of the first translatable member or the second translatable member comprises a corresponding feature that is positioned within the slot.

9. The strip belt conveyor assembly of claim 6, wherein the first translatable member is configured to translate along a threaded shaft, wherein the threaded shaft is configured to translate the first translatable member in the transverse direction when the threaded shaft is rotated.

10. The strip belt conveyor assembly of claim 9, further comprising an insert that has one or more female threads, wherein the threaded shaft is positioned within the insert.

11. The strip belt conveyor assembly of claim 6, wherein a longitudinal length of each of the plurality of roller assemblies is approximately equal.

12. The strip belt conveyor assembly of claim 6, wherein the first translatable member comprises a first angled portion and the second translatable member comprises a second angled portion that corresponds to the first angled portion of the first translatable member.

13. The strip belt conveyor assembly of claim 6, further comprising:

a deck comprising a stepped portion that comprises a plurality of transverse portions, each of the plurality of transverse portions positioned at a different location along the longitudinal direction, wherein each of the plurality of roller assemblies are positioned proximate to a corresponding transverse portion of the plurality of transverse portions.

14. A roller assembly for a conveyor assembly, the roller assembly defining a longitudinal direction and a transverse direction, the roller assembly comprising:

a roller; and a tensioning assembly that comprises:

a first translatable member that is configured to translate in the transverse direction; and a second translatable member that is configured to translate in the longitudinal direction, wherein one of the first translatable member or the second translatable member comprises a slot, wherein the other of the first translatable member or the second translatable member comprises a corresponding feature that is positioned within the slot, wherein the roller is rotatably coupled to the second translatable member, and wherein the tensioning assembly is configured such that translation of the first translatable member in the transverse direction causes the translation of the second translatable member in the longitudinal direction.

15. The roller assembly of claim 14, wherein the roller is rotatably coupled to the second translatable member such that the translation of the second translatable member in the longitudinal direction causes the roller to translate in the longitudinal direction.

16. The roller assembly of claim 14, wherein the first translatable member is configured to translate along a threaded shaft, wherein the threaded shaft is configured to translate the first translatable member in the transverse direction when the threaded shaft is rotated.

17. The roller assembly of claim 16, further comprising an insert that has one or more female threads, wherein the threaded shaft is positioned within the insert.

18. The roller assembly of claim 16, wherein the first translatable member comprises a through hole that has one or more threads, wherein the threaded shaft is positioned within the through hole of the first translatable member.

19. The roller assembly of claim 14, wherein the first translatable member has a first angled portion and the second translatable member has a second angled portion that corresponds to the first angled portion of the first translatable member.

* * * * *